July 4, 1933.    B. BRONSON    1,916,461
TREAD MEMBER
Filed Jan. 30, 1929
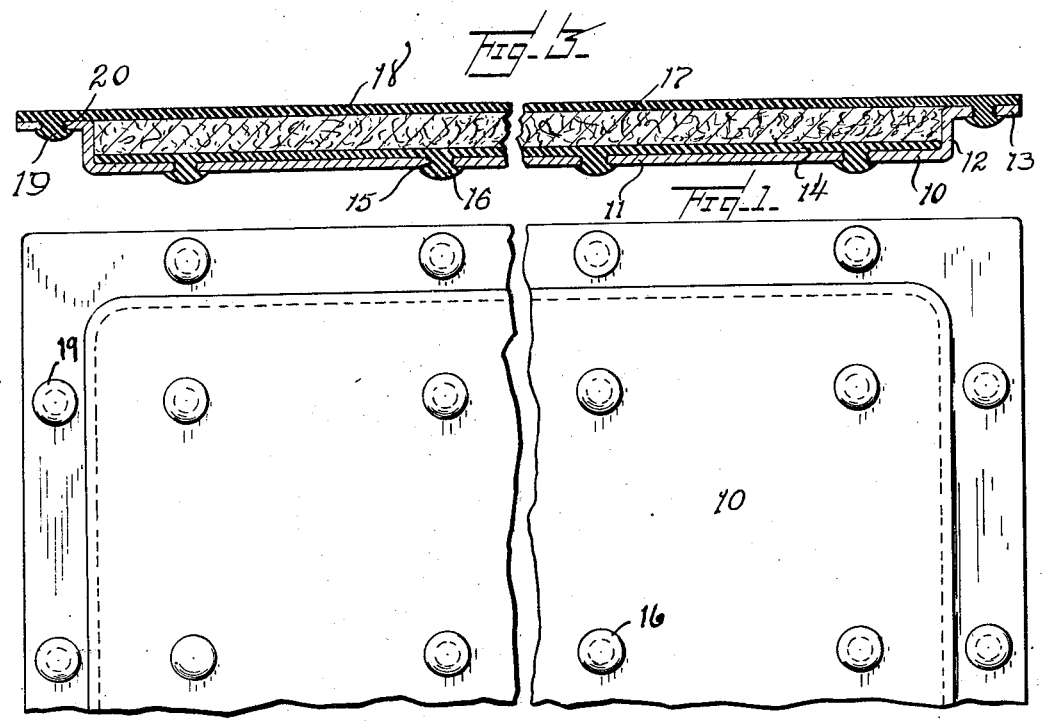
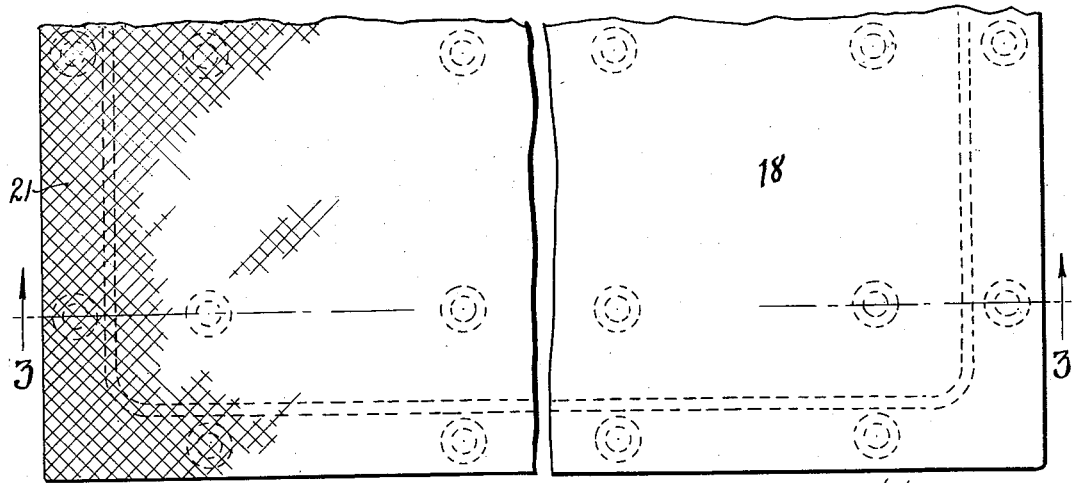
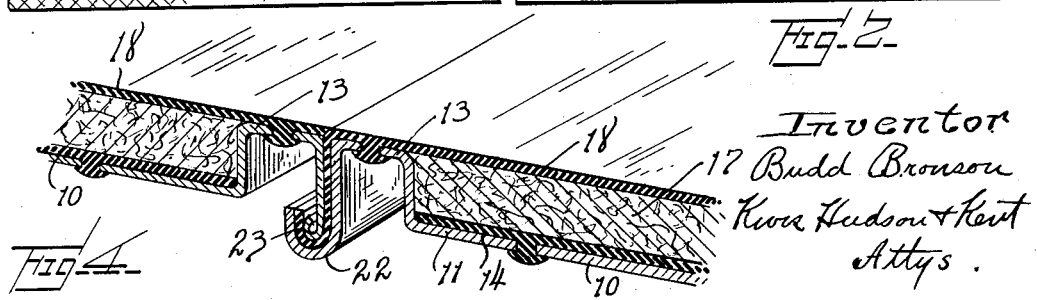
Inventor
Budd Bronson
Knox Hudson & Kent
Attys.

Patented July 4, 1933

1,916,461

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

TREAD MEMBER

Application filed January 30, 1929. Serial No. 336,304.

This invention relates to tread members and more particularly to a novel form of construction for composite tread members.

An object of this invention is to provide a composite tread member of durable and practical construction suitable for use wherever an efficient form of tread member is required.

Another object of this invention is to provide a tread member which will be yielding and springy under foot.

Another object of this invention is to provide a strong and durable tread member which will not collect dust and moisture.

Other objects and advantages of this invention will be apparent from the following description taken in connection with the accompanying drawing, in which—

Fig. 1 is a top plan view of the tread member of my invention;

Fig. 2 is a bottom plan veiw of my tread member;

Fig. 3 is a cross-sectional view taken on line 3—3 of Fig. 2; and

Fig. 4 is a perspective view showing how adjacent tread members may be connected together.

Referring now to the drawing in detail it will be seen that my tread member is of composite form, and in the embodiment of my invention herein disclosed I provide a metallic base 10 to which layers of material are secured. For this metallic base I prefer to use hot-passed steel because the surface of this material is inherently porous, and rubber vulcanized to such a surface will cling tightly. The base 10, of my tread member, may be shaped by means of dies, or in any suitable way, to provide the shallow pan-shaped form shown in this instance. It is not essential to my invention that the metal base be pan-shaped, but I have found that a base which assumes this shape may be conveniently employed. This pan-shaped base preferably has a flat bottom portion 11 provided with an integral vertical side wall 12. The side wall 12 terminates in a laterally extending, flat, marginal flange 13, of substantially uniform width. A sheet of rubber 14 conforms to the shape of the bottom portion 11, of the base 10, and is vulcanized thereto. As an additional means of locking the sheet 14 to the base, perforations 15 may be provided in the bottom portion 11, and during the vulcanizing process rubber rivets 16 will be formed from material which is forced through the perforations.

To make the member yielding and springy, when trod upon, a layer 17, of cushioning material, is vulcanized to the sheet 14 and fills the depression of the base 10. For this layer of yielding material I have found that felt composed of matted jute fibers with or without a coarse burlap backing is very satisfactory, but it is obvious that various materials would serve equally well.

A second sheet of rubber 18 is vulcanized to layer 17, and the marginal portions of this sheet overlie and are vulcanized to the marginal flange 13. In addition to the vulcanizing of sheet 18 to the flange 13, these parts are locked together by rubber rivets 19 which are formed integral with the sheet in the vulcanizing process and extend through spaced perforations 20.

In making tread members according to my invention I prefer to vulcanize the sheets of rubber to the metal base and to the layer of felt by one operation. To accomplish this I apply a layer of rubber upon the bottom portion of the pan-shaped metal base, then I place a layer of felt 17 on the rubber and apply another layer of rubber over the felt and flange 13, after which I vulcanize both layers of rubber at the same time. By this process the layers or sheets of rubber are vulcanized and locked to the metal base, and at the same time are vulcanized to the layer of felt.

If desired the top sheet of rubber may be provided with a suitable design or configuration, as indicated at 21, to improve the appearance of the member and to prevent slipping.

Due to the yielding characterisitic of the layer of felt, a tread member constructed according to my invention will be yielding and springy when walked upon. The rubber sheets which are vulcanized to the layer of felt serve to hold the felt securely in place, and the top sheet protects the felt from dust, moisture and the scuffing of feet. The metal base 10 gives the tread member strength and rigidity, and the member may be supported at points along the marginal flange 13, or in any other convenient manner.

In Fig. 4 of the drawing I show a form of construction which permits two or more of my tread members to be connected to form a floor surface. In this form of construction an edge of the tread member is provided with a hook 22 which receives the bead 23 of a complementary tread member. The hook 22 is preferably formed from an extension of the marginal flange 13 of one tread member, while the bead 23 is preferably formed from an extension of the marginal flange 13 of the adjacent tread member. To prevent rattling at this connection, hook 22 may be rubber covered as shown by extending the rubber sheet 18.

The device which I have shown and described has been termed a tread member, but it will be understood and readily appreciated that this device is not limited in its application to use as a tread member, but may be used for various purposes.

While I have shown and described the preferred form which the metal base and tread member may assume, it should be understood that the shape of the metal base will be governed by the shape of tread member desired for a definite purpose, and that my invention is in no way limited to the particular shape of tread member herein disclosed, but is intended to include such forms as come within the scope of the appended claims.

Having thus described my invention, what I claim is:

1. A device of the character described comprising a metallic base having a pan-like depression therein, cushioning material in said depression, and a layer of rubber attached to said cushioning material and to said base.

2. A composite tread unit of the character described comprising a layer of cushioning material having sheets of rubber attached to opposite sides thereof, a metallic base adapted to support said layer, and means for attaching one of said sheets to said base.

3. A device of the character described comprising a metallic base having a depression and a marginal flange, yielding material in said depression, and a layer of rubber attached to said yielding material and to said marginal flange.

4. A device of the character described comprising a metallic base having a raised marginal portion, a sheet of rubber attached to said base, a second sheet of rubber attached to said marginal portion, and yielding material interposed between said sheets.

5. A device of the character described comprising a metallic plate, a sheet of rubber vulcanized to said plate, a layer of felt vulcanized to said sheet of rubber, and a second sheet of rubber, vulcanized to said layer of felt and to said plate.

6. A device of the character described comprising a layer of fibrous material, a layer of rubber vulcanized to each side of said first mentioned layer, and a metallic base to which said layers of rubber are attached.

7. Flooring of the character described comprising metal members each having a depression therein and provided with interengaging marginal portions, cushioning material in the depression of said members, and sheets of rubber covering the cushioning material and secured to the respective metal members.

8. Flooring of the character described comprising metal members each having a depression therein and provided with cooperating marginal portions, cushioning material in the depressions of said members, and sheets of rubber covering the cushioning material and secured to the respective metal members, one of said sheets being extended between said cooperating marginal portions.

In testimony whereof, I hereunto affix my signature.

BUDD BRONSON.